United States Patent
Hu et al.

(10) Patent No.: US 9,180,786 B2
(45) Date of Patent: Nov. 10, 2015

(54) METHOD TO ENSURE RELIABLE RECEPTION OF ELECTRIC VEHICLE ASSOCIATION MESSAGES

(71) Applicant: Ford Global Technologies, LLC, Dearborn, MI (US)

(72) Inventors: Fengzhuo Hu, Ann Arbor, MI (US); Michael Edward Loftus, Northville, MI (US); Alan Scarantino, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 14 days.

(21) Appl. No.: 14/101,648

(22) Filed: Dec. 10, 2013

(65) Prior Publication Data

US 2015/0158394 A1   Jun. 11, 2015

(51) Int. Cl.
*H04L 12/58* (2006.01)
*B60L 11/18* (2006.01)

(52) U.S. Cl.
CPC .................................. *B60L 11/1846* (2013.01)

(58) Field of Classification Search
None
See application file for complete search history.

(56) References Cited

U.S. PATENT DOCUMENTS

| | | | |
|---|---|---|---|
| 5,434,845 A * | 7/1995 | Miller | 370/252 |
| 6,243,399 B1 | 6/2001 | Kaewell et al. | |
| 6,792,286 B1 | 9/2004 | Bharath et al. | |
| 7,359,364 B2 * | 4/2008 | Yuhan et al. | 370/341 |
| 7,664,821 B1 * | 2/2010 | Ancin et al. | 709/206 |
| 2003/0033522 A1 | 2/2003 | Bilgic et al. | |
| 2006/0036727 A1 * | 2/2006 | Kurapati et al. | 709/224 |
| 2007/0112602 A1 * | 5/2007 | Bellon et al. | 705/3 |
| 2011/0106858 A1 * | 5/2011 | Rieger | 707/805 |
| 2013/0160086 A1 * | 6/2013 | Katar et al. | 726/4 |
| 2013/0215951 A1 * | 8/2013 | Nuzman | 375/227 |

* cited by examiner

*Primary Examiner* — Thomas Tarcza
*Assistant Examiner* — Richard Goldman
(74) *Attorney, Agent, or Firm* — David B. Kelley; Brooks Kushman, P.C.

(57) ABSTRACT

A vehicle controller of a vehicle may set a message acceptance type and a time window for response according to a type of association procedure message received from a requester, provide the association procedure message to electric vehicle supply equipment, and return a received response message to the requester when the response message is of the acceptance type and received within the time window, and otherwise reject the response message.

15 Claims, 4 Drawing Sheets

METHOD TO ENSURE RELIABLE RECEPTION OF ELECTRIC VEHICLE ASSOCIATION MESSAGES

TECHNICAL FIELD

The present application relates to electric vehicles, and more specifically, to ensuring the reliable reception of messages between electric vehicles and electric vehicle supply equipment.

BACKGROUND

Electric or hybrid electric vehicles may be charged at a relatively slow rate from conventional power outlets, or at a relatively fast rate from dedicated vehicles chargers. To receive power from vehicle chargers or other types of electric vehicle supply equipment (EVSE), the electric vehicle may be required to be physically connected to and electronically associated with the EVSE. In some cases, the EVSE may perform authentication of the electric vehicle, both to ensure the vehicle is authorized to use the charger and also to bill the vehicle for charger time or energy dispensed.

SUMMARY

A vehicle may include a vehicle controller managing an association procedure between the vehicle and one or more EVSEs. The controller may set a message acceptance type and a time window for response according to a type of association procedure message received from a requester, provide the association procedure message to EVSE, and return a received response message to the requester when the response message is of the acceptance type and received within the time window, and otherwise reject the response message.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

EVSEs and vehicles perform an association procedure designed to allow EVSEs and vehicles to identify one another when a vehicle is plugged in. If multiple association procedures between vehicles and EVSEs are being performed in close physical proximity (such as at a charging station including multiple EVSEs), messages from the different EVSEs and vehicles may be overheard by one another. This message crosstalk may result in failures in the association procedure between vehicles and EVSEs, preventing the vehicles from charging. To avoid communication errors resulting from message crosstalk, a vehicle controller may filter out messages that are not of a message acceptance type corresponding to the message sequence of the association procedure or not within a time window during which the response message should be received. By filtering messages according to message type and time, the vehicle may be able to reduce the incidence of crosstalk-related faults in association procedures between the vehicle and EVSEs, thereby improving vehicle charging reliability.

Figure 1:
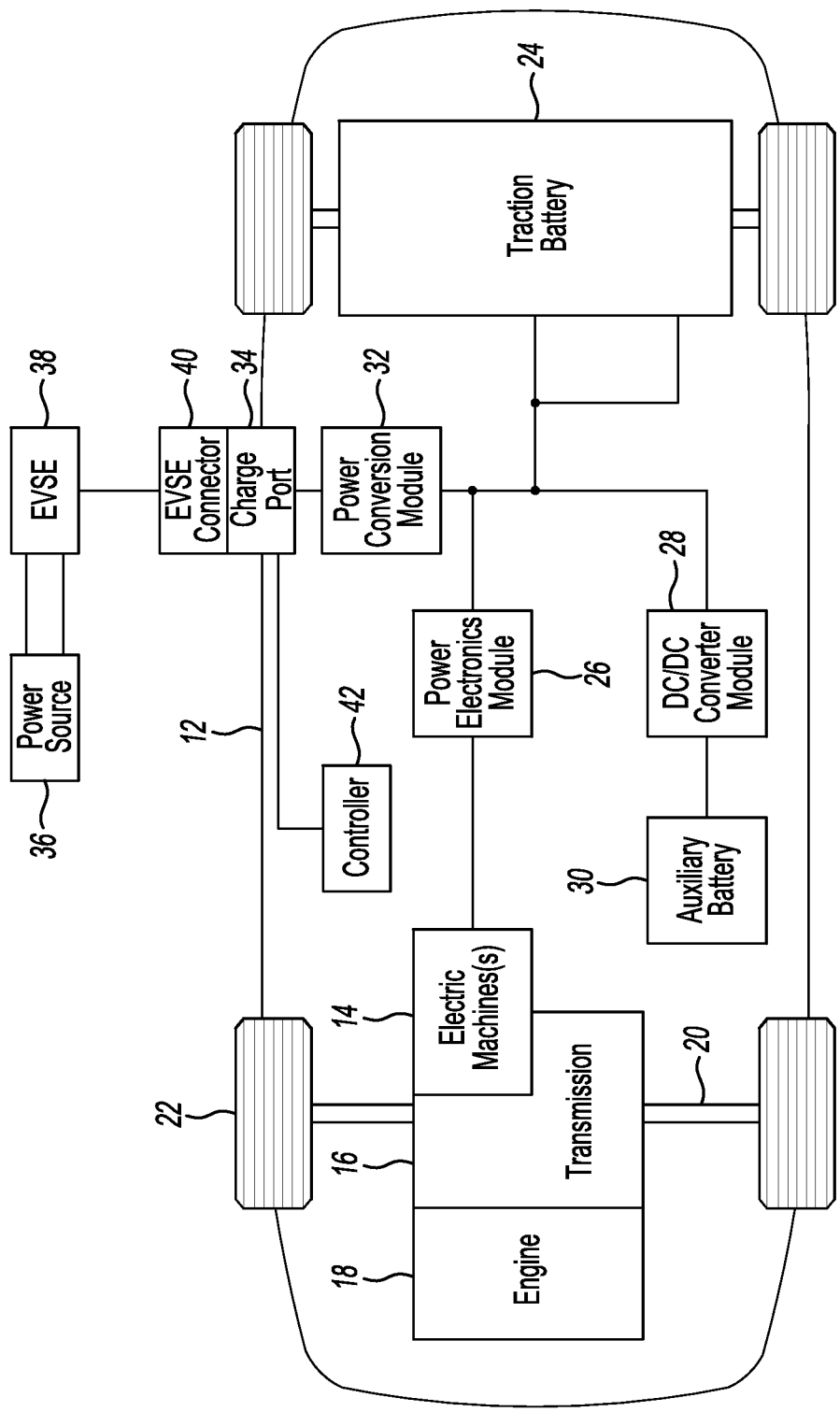
FIG. 1 depicts a typical plug-in hybrid-electric vehicle.

FIG. 1 depicts a typical plug-in hybrid-electric vehicle (HEV). A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also reduce vehicle emissions by allowing the engine 18 to operate at more efficient speeds and allowing the hybrid-electric vehicle 12 to be operated in electric mode with the engine 18 off under certain conditions.

A traction battery 24 stores energy that can be used by the electric machines 14. A traction battery 24 typically provides a high voltage DC output. The traction battery 24 is electrically connected to one or more power electronics modules. One or more contactors (not shown) may isolate the traction battery 24 from other components when opened and connect the traction battery 24 to other components when closed. The power electronics module 26 is also electrically connected to the electric machines 14 and provides the ability to bi-directionally transfer energy between the traction battery 24 and the electric machines 14. For example, a typical traction battery 24 may provide a DC voltage while the electric machines 14 may require a three-phase AC current to function. The power electronics module 26 may convert the DC voltage to a three-phase AC current as required by the electric machines 14. In a regenerative mode, the power electronics module 26 may convert the three-phase AC current from the electric machines 14 acting as generators to the DC voltage required by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. The low-voltage systems may be electrically connected to an auxiliary battery 30 (e.g., 12V battery).

The vehicle 12 may be an electric vehicle or a plug-in hybrid vehicle in which the traction battery 24 may be recharged by an external power source 36. The external power source 36 may be a connection to an electrical outlet. The external power source 36 may be electrically connected to one or more EVSEs 38. (While a single EVSE 38 is illustrated in FIG. 1, it should be noted that multiple EVSEs 38 may be connected to the external power source 36.) The EVSE 38 may provide circuitry and controls to regulate and manage the transfer of energy between the power source 36 and the vehicle 12. The external power source 36 may provide DC or AC electric power to the EVSE 38. The EVSE 38 may have an EVSE connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically connected may transfer power using a wireless inductive coupling.

In addition to the transfer of energy from EVSE 38 to vehicle 12, EVSEs 38 may utilize power line communication to provide communication capabilities with connected vehicles 12. One type of power line communication performed between EVSEs 38 and vehicles 12 is an association procedure configured to allow EVSEs 38 and vehicles 12 to identify one another when a vehicle 12 is plugged in. The association procedure may be implemented in various ways, such as using the signal level attenuation characterization (SLAC) protocol as defined by the HomePlug® Green PHY specification. To implement the SLAC protocol, the vehicle 12 may include a controller 42 configured to perform a controlled sequence of requests and responses to the requests.

Figure 2:
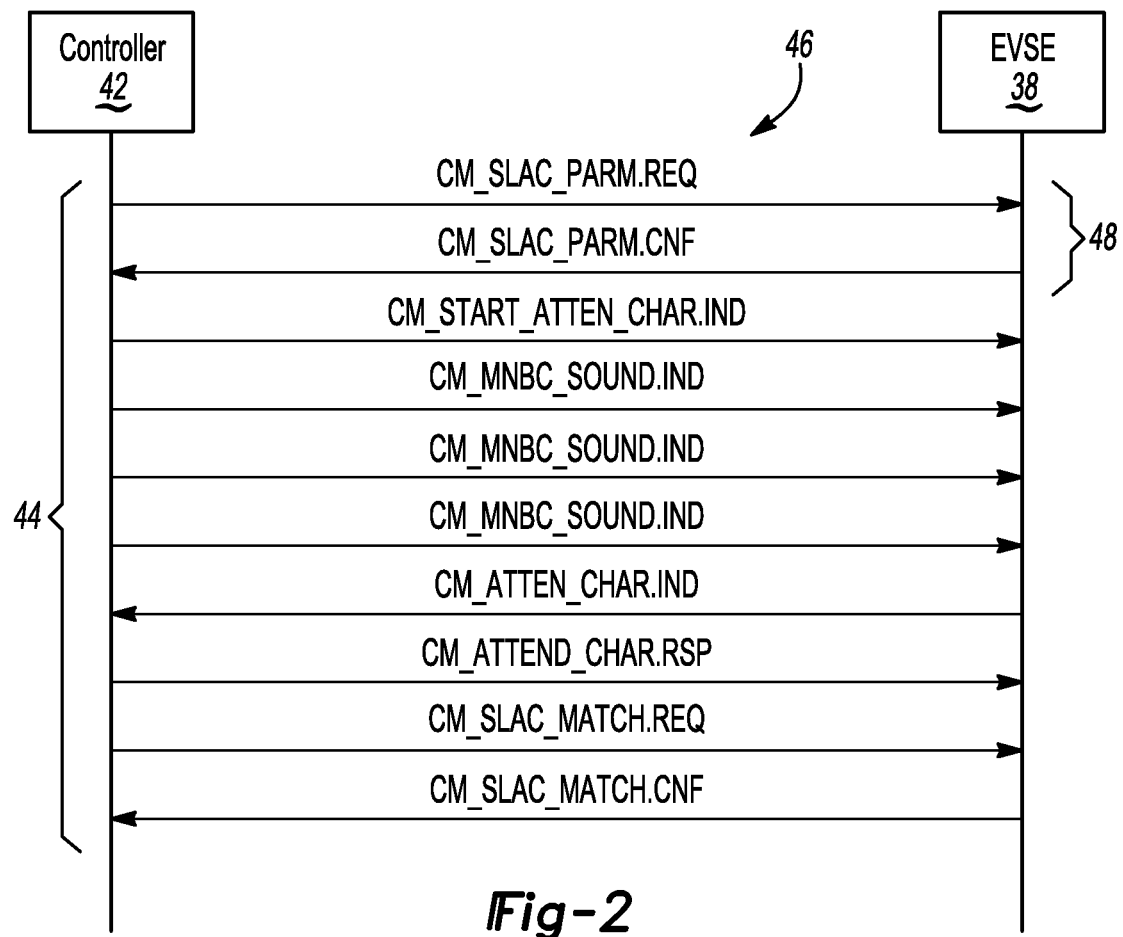
FIG. 2 depicts an exemplary association procedure between an electric vehicle and electric vehicle supply equipment.

FIG. 2 depicts an exemplary association procedure between an electric vehicle 12 and EVSE 38. The SLAC protocol may be initiated by a controller 42 of a vehicle 12 upon connection of the EVSE connector 40 into the charge port 34 of the vehicle 12, and may include a broadcast by the vehicle 12 of a series of sounding messages 44. EVSEs 38 receiving these sounding messages 44 may compute an average power received for the sounding messages 44. The receiving EVSEs 38 may further report this information back to the vehicle 12, allowing the vehicle 12 to identify the EVSE 38 having the highest received signal strength as the EVSE 38 with which the vehicle 12 should associate. The SLAC protocol may further support additional functionality, such as requests by the vehicle 12 for parameters of the association procedure (e.g., a number of sounding messages to send or a number of permissible message 44 retries) as well as messages 44 confirming association of the vehicle 12 with an identified EVSE 38. While this and other examples described herein utilize the SLAC protocol, it should be noted that the association procedure between the vehicle 12 and EVSE 38 may be implemented using various other message 44 protocols and suitable communication technologies.

More specifically, upon connection of an EVSE connector 40 into a charge port 34 of a vehicle 12, the controller 42 of the vehicle 12 may send a CM_SLAC_PARM.REQ request message 44 to any connected EVSEs 38 to query for association procedure parameters. The EVSEs 38 receiving the message may reply with a CM_SLAC_PARM.CNF message 44 indicating the parameters of the association procedure, such as the number of sounding messages 44 to send or a number of permissible message 44 retries. The controller 42 may further send a CM_START_ATTEN_CHAR.IND message 44 to the EVSEs 38 to signal the initiation of the association process, as well as a number of broadcast CM_MNBC_SOUND.IND messages 44 based on the association procedure parameters. In response, the controller 42 may receive CM_ATTEN_CHAR.TND messages 44 from the connected EVSEs 38 including attenuation information computed by the EVSEs 38 based on the average received power of the sound messages 44. The controller 42 may acknowledge receipt of the attenuation information by returning CM_ATTEN_CHAR.RSP response messages 44 to the connected EVSEs 38. Based on the returned attenuation information, the controller 42 may identify the EVSE 38 having the lowest level of attenuation as being the one of the EVSEs 38 to which the vehicle 12 is connected. The controller 42 may accordingly send a CM_SLAC_MATCH.REQ message 44 to the identified EVSE 38 to notify the EVSE 38 that it is identified as the associated charging station for the vehicle 12. The associated EVSE 38 may receive the message 44, and provide a CM_SLAC_MATCH.CNF confirmation message 44 in response.

Thus each SLAC message 44 may be of a message type 46 indicative of the purpose of the particular message 44. Moreover, messages 44 may also be associated with time windows 48 during which response messages 44 should be received. (Only a time window 48 for one message 44 is depicted in FIG. 2 for clarity in the illustration.) If a received response message 44 is not of the type corresponding to the message type 46 or if the response message 44 is not received within the time window 48, then the controller 42 may trigger a fault with the association procedure. For example, a fault may be generated if the CM_SLAC_PARM.CNF response message 44 is not received by the vehicle 12 within the illustrated time window 48 of the CM_SLAC_PARM.REQ message 44. If the association procedure fails, the vehicle 12 may be unable to be charged by the EVSE 38.

In many cases, multiple EVSEs 38 and vehicles 12 may be operating in relatively close physical proximity. If multiple association procedures (such as the SLAC procedure described in detail above) are being performed in close physical proximity, messages 44 from the different EVSEs 38 and vehicles 12 may be overheard by one another, causing the vehicles 12 to experience crosstalk issues. These crosstalk issues may result in failures in the association procedure between vehicles 12 and EVSEs 38, preventing the vehicles 12 from charging. As an example, a controller 42 of a vehicle 12 may send out a CM_SLAC_PARM.REQ request message 44, but may overhear a CM_ATTEN_CHAR.TND response 44 intended for another vehicle 12. The controller 42 may identify the out of sequence message 44 as a fault, causing the association procedure to fail. As another example, the controller 42 may send a CM_SLAC_PARM.REQ request message 44, but may overhear a CM_SLAC_PARM.CNF response intended for another vehicle 12 as well as the CM_SLAC_PARM.CNF message 44 intended for the vehicle 12, also causing a fault in the association sequence. To avoid these types of faults, the controller 42 may implement a sequence filter 52 configured to filter out messages 44 that do not meet the message 44 sequence or that are not within the time window 48 for the current message 44.

Figure 3:
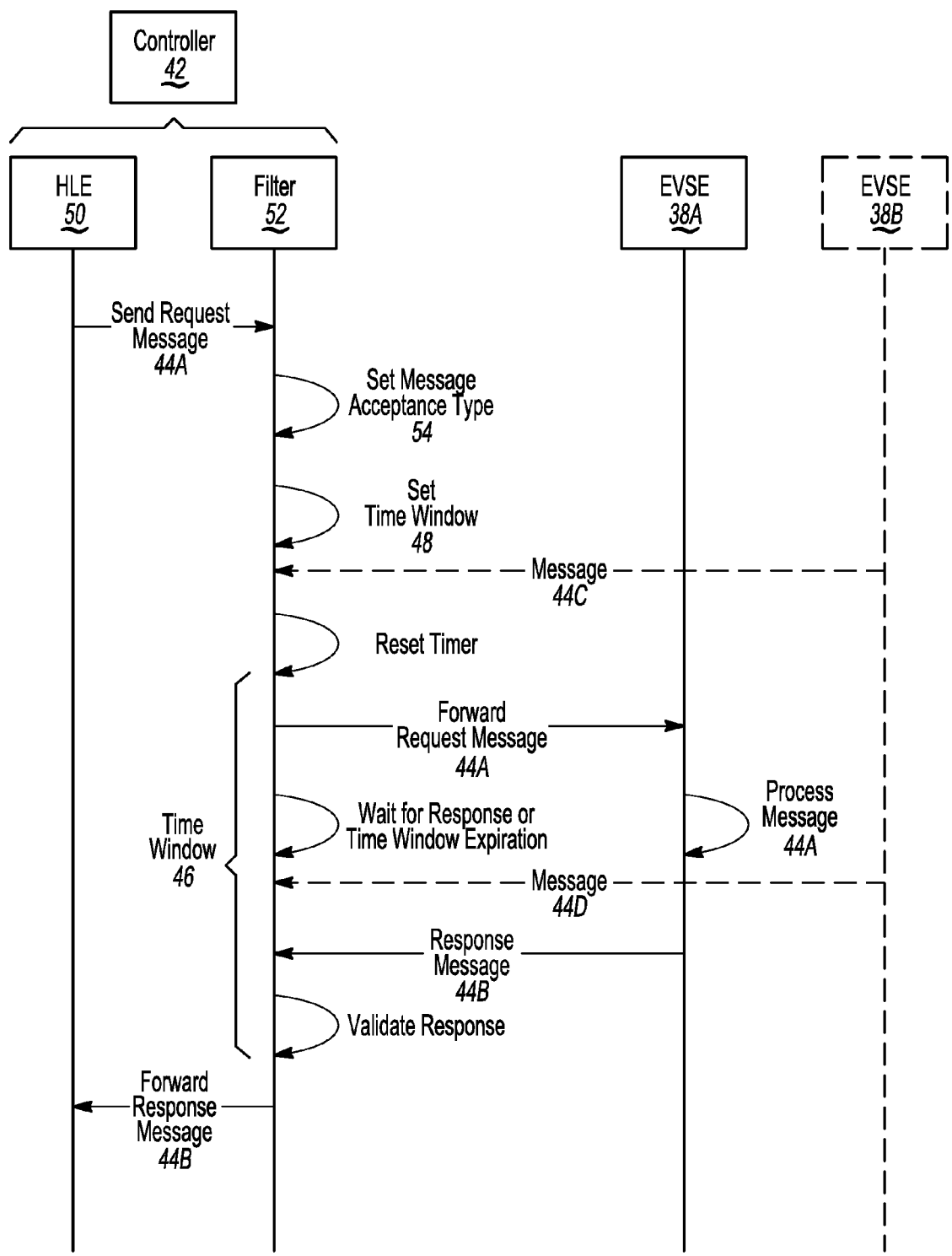
FIG. 3 depicts an exemplary sequencing filter for a portion of an exemplary association procedure.

FIG. 3 depicts an exemplary filtering of a portion of an association procedure by way of a filter 52 of a controller 42 of a vehicle 12. A higher level entity (HLE) 50 of the controller 42 of the vehicle 12 may be configured to send a request message 44 to the EVSE 38-A. As part of sending the request message 44 to the EVSE 38-A, the message filter 52 may be configured to receive or otherwise identify the sending of the message 44 by the HLE 50, and set a message acceptance type 54 according to the message type 46 of the outgoing message 44. As one example, if the request message 44 is of a CM_SLAC_MATCH.REQ message 44 type, then the message acceptance type 54 may be set to wait for a message 44 of a CM_SLAC_MATCH.CNF response type.

The filter 52 may be further configured to set a time window 48 according to the type of the outgoing message 44. For instance, for the CM_SLAC_MATCH.REQ message 44, the filter 52 may set a time window 48 of 0.3 seconds. The filter 52 may also reset a timer or otherwise indicate the current time, and forward the request message 44 to the EVSE 38-A. When a message is forwarded from the controller 42 to the EVSE 38-A, the time window 48 for that message 44 may begin. The EVSE 38-A may process the message 44, and the filter 52 may wait for a response message 44 within the time window 48 and of the message acceptance type 54. Within that time window 48, the controller 42 may expect to receive a correct message 44 type of a response from the EVSE 38.

If a response message 44 is received within the time window 48 and of the message acceptance type 54, the filter 52 may forward the message to the HLE 50 for further processing. To prevent communication errors or faults within the association procedure, messages 44 that do not fall within the time window 48 (e.g., the message 44-C) or that are not of the correct message acceptance type 54 (e.g., the message 44-D) may be discarded by the filter 52.

Figure 4:
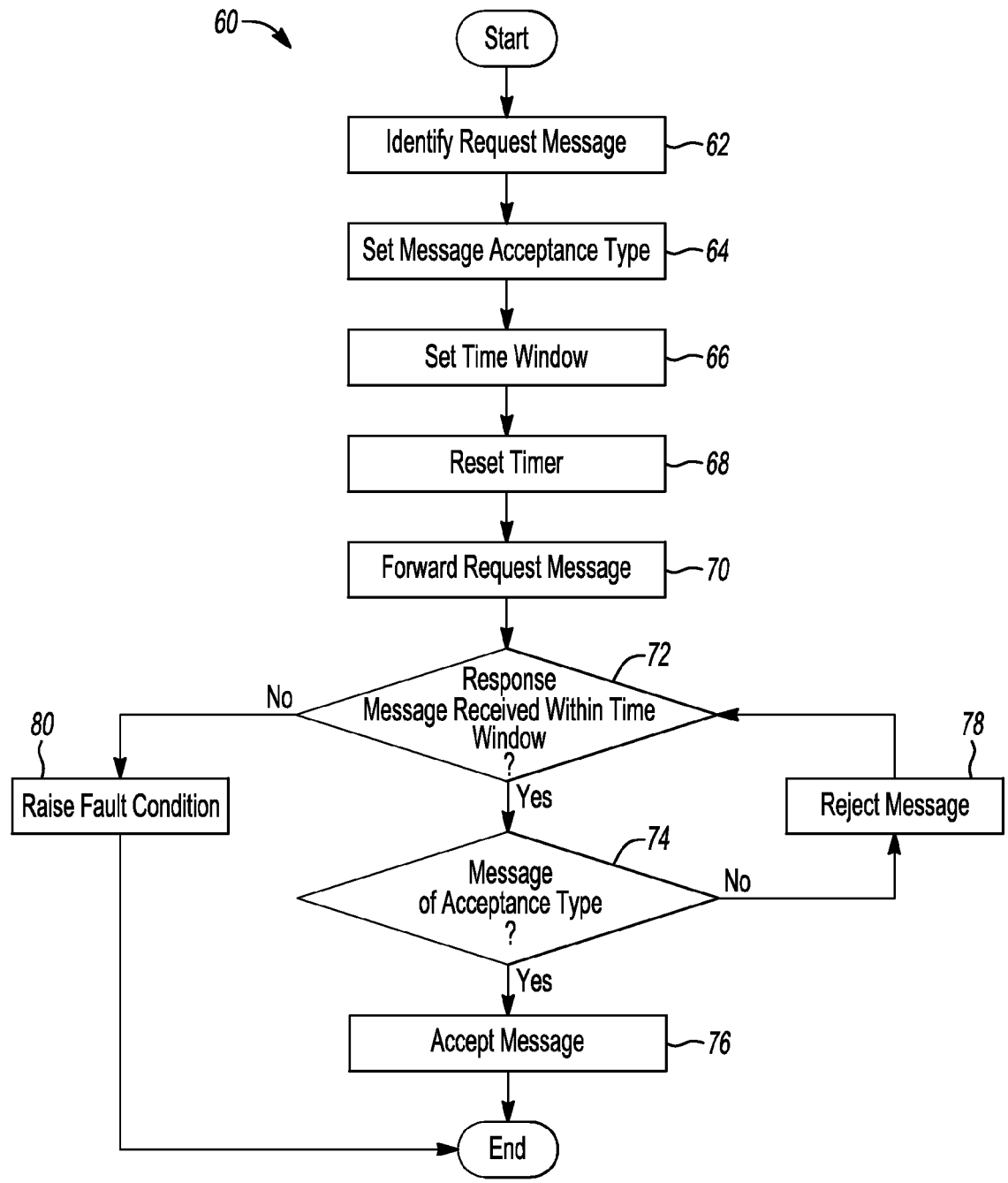
FIG. 4 depicts an exemplary process for implementing a sequencing filter to avoid crosstalk issues among electric vehicles.

FIG. 4 depicts an exemplary process 60 for implementing a filter to avoid crosstalk issues among vehicles 12. The process 60 may be performed by various devices, such as by a filter 52 of a controller 42 of a vehicle 12 in communication with one or more EVSEs 38.

At block 62, the controller 42 identifies a request message 44 to be sent to one or more EVSEs 38. For example, as part of sending the request message 44 to the EVSEs 38, the message filter 52 may be configured to receive or otherwise identify the sending of the message 44 by the HLE 50.

At block 64, the controller 42 sets a message acceptance type 54 according to the identified request message 44. For instance, the message filter 52 may identify a message type field of the request message 44, and may determine a corresponding message acceptance type 54 based on the message type. As one example, if the request message 44 is of a CM_SLAC_MATCH.REQ message 44 type, then the message acceptance type 54 may be set to wait for a message 44 of a CM_SLAC_MATCH.CNF response type.

At block 66, the controller 42 sets a time window 48 according to the identified request message 44. For instance, the message filter 52 may set a time window 48 to an amount of time corresponding to the amount of time specified by the association procedure (or by association procedure parameters queried by the vehicle 12) according to the type of the outgoing message 44. As one example, for the CM_SLAC_MATCH.REQ message 44, the filter 52 may set a time window 48 to 0.3 seconds.

At block 68, the controller 42 resets a timer. As some possibilities, the message filter 52 may note a current time to use as a point of comparison, may set a countdown timer to the time window 48 amount of time, or may reset an incrementing timer to zero.

At block 70, the controller 42 forwards the message 44 on to message recipients. For example, the message filter 52 may forward the message 44 onto the EVSEs 38.

At decision point 72, the controller 42 determines whether a message 44 has been received within the time window 48. For instance, the message filter 52 may be notified by the controller 42 of messages 44 received from the EVSEs 38 to be provided to the HLE 50. If a message 44 is received, control passes to decision point 74. Otherwise, if the time window 48 expires, control passes to block 80.

At decision point 74, the controller 42 determines whether the received message 44 is of the message acceptance type 54. For example, the controller 42 may compare a message type field of the received message 44 with the message acceptance type 54. If the received message 44 is of the message acceptance type 54, control passes to block 76. Otherwise, control passes to block 78.

At block 76, the controller 42 forwards the accepted message 44 to the HLE 50. The controller 42 may further perform other cleanup operations based on the message acceptance, such as resetting the time window 48 (e.g., to zero). After block 76, the process 60 ends.

At block 78, the controller 42 rejects the message 44. Accordingly, received messages 44 of unexpected types are filtered out, thereby avoiding faults resulting from vehicle 12 crosstalk issues. After block 78, control passes to decision point 72.

At block 80, the controller 42 signals a fault, as no response message 44 of the message acceptance type 54 was received within the time window 48. After block 80, the process 60 ends. In some examples, rather than end the process 60, if one or more message retries remain for the request message 44 (e.g., as determined according to association procedure parameters received from a CM_SLAC_PARM.REQ/CM_SLAC_PARM.CNF sequence), control may instead pass to block 62 to perform additional message 44 retries.

Thus, a controller 42 of a vehicle 12 may implement a filter 52 to discard messages 44 that are not of an expected message acceptance type 54, or messages that are of an expected message acceptance type 54 but that are received before or after a time window 48. By filtering messages according to message acceptance type 54 and time windows 48, the vehicle 12 may be able to reduce the incidence of crosstalk-related faults in association procedures between the vehicle 12 and EVSEs 38, thereby improving the reliability of the vehicle 12 to EVSE 38 association.

Variations on the described systems and method are possible. As one example, a vehicle 12 that identifies receipt of a message 44 of an unexpected type or outside of a time window 48 may provide a fault warning message 44 to other connected vehicles 12 to inform them that there may be a potential for crosstalk or other communications issues. As another example, vehicles 12 may provide a fault warning message 44 to the EVSEs 38 to allow the EVSEs 38 to keep track of the amount of crosstalk issues experienced over time, and to allow technicians to identify and repair EVSEs 38 that experience a disproportionate amount of crosstalk issues.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a vehicle controller configured to
      set a message acceptance type and a time window for response according to a type of request message received from an in-vehicle higher-level entity (HLE),
      send the request message over a vehicle connection to electric vehicle supply equipment (EVSE), and return a response message received over the connection to the HLE only when the response message is of the acceptance type and received within the time window.

2. The vehicle of claim 1, the vehicle controller further configured to:
   reset a timer when sending the request message; and
   identify the response message as being within the time window according to the timer.

3. The vehicle of claim 1, the vehicle controller further configured to reset the time window when returning the response message to the requester.

4. The vehicle of claim 1, the vehicle controller further configured to:
   identify a message type of the response message according to a type field of the response message; and
   compare the message type with the acceptance type to verify the response message is of the acceptance type.

5. The vehicle of claim 1, the vehicle controller further configured to broadcast a warning message over the connection to at least one of the EVSE and another vehicle when rejecting the response message.

6. A method comprising:
   setting, by a vehicle controller of a vehicle, a message acceptance type and a time window for response according to a type of request message received from a higher-level entity (HLE), the request message being sent as a portion of an association procedure between the vehicle and electric vehicle supply equipment (EVSE);
   sending the association procedure message to the EVSE over a connection between the vehicle and the EVSE; and
   returning a response message received over the connection to the HLE by the vehicle controller when the response message is of the acceptance type and received within the time window, and otherwise rejecting the response message.

7. The method of claim 6, further comprising:
   resetting a timer when sending the request message; and
   identifying the response message as being within the time window according to the timer.

8. The method of claim 6, further comprising resetting the time window when returning the response message to the requester.

9. The method of claim 6, further comprising:
   identifying a message type of the response message according to a type field of the response message; and
   comparing the message type with the acceptance type to verify the response message is of the acceptance type.

10. The method of claim 6, further comprising broadcasting a warning message over the connection to at least one of the EVSE and another vehicle when rejecting the response message.

11. A non-transitory computer-readable medium tangibly embodying computer-executable instructions of a software program, the software program being executable by a processor of a vehicle controller to provide operations comprising:
    setting a message acceptance type and a time window for response according to a type of request message received from a higher-level entity (HLE), the request message being sent as a portion of an association procedure between the vehicle and electric vehicle supply equipment (EVSE);
    providing the association procedure message to the ESVE; and
    returning a response message received over the connection to the HLE when the response message is of the acceptance type and received within the time window, and otherwise rejecting the response message.

12. The non-transitory computer-readable medium of claim 11, the software program further executable to provide operations comprising:
    resetting a timer when sending the request message; and
    identifying the response message as being within the time window according to the timer.

13. The non-transitory computer-readable medium of claim 11, the software program further executable to provide operations comprising resetting the time window when returning the response message to the requester.

14. The non-transitory computer-readable medium of claim 11, the software program further executable to provide operations comprising:
    identifying a message type of the response message according to a type field of the response message; and
    comparing the message type with the acceptance type to verify the response message is of the acceptance type.

15. The non-transitory computer-readable medium of claim 11, the software program further executable to provide operations comprising broadcasting a warning message over the connection to at least one of the EVSE and another vehicle when rejecting the response message.

* * * * *